3,451,538
Patented June 24, 1969

3,451,538
PACKAGING FILMS WITH IMPROVED PROPERTIES
Quirino A. Trementozzi, Springfield, Mass., assignor to Monsanto Company, St. Louis, Mo., a corporation of Delaware
No Drawing. Continuation-in-part of application Ser. No. 544,109, Apr. 21, 1966. This application May 29, 1967, Ser. No. 642,207
Int. Cl. B65b 29/00; C08f 37/00
U.S. Cl. 206—46                                     7 Claims

ABSTRACT OF THE DISCLOSURE

Disclosed herein are packaging materials having oxygen permeability of less than 6.5 cc./100 sq. in. 24 hr. atmos. mil at 73° F. and water vapor transmission of less than 8.5 gms./24 hr. 100 sq. in. mil at 100° F. and 95% R.H. The materials are based upon copolymers of acrylonitrile wherein the acrylonitrile is present in a range of from 55 to 90% by weight. A preferred copolymer is 80/20 acrylonitrile/isobutylene. The process for the manufacture of the packaging materials is also claimed.

CROSS REFERENCES TO RELATED APPLICATION

This is a continuation-in-part of copending application Ser. No. 544,109, filed Apr. 21, 1966, now abandoned.

BACKGROUND OF THE INVENTION

Field of the invention

This invention relates to novel packaging materials. More particularly it relates to novel packaging materials based upon acrylonitrile with other comonomers, said packaging materials having improved resistance to oxygen permeability and water vapor transmission and further exhibiting excellent processing properties.

Description of the prior art

The currently available synthetic polymers which are used in the preparation of packaging materials for food stuffs, medicines, and related substances are characterized by one or more serious deficiencies which detract from their packaging utility. Most synthetic polymers with good thermal forming or processing characteristics have a high rate of oxygen permeability and water vapor transmissions so that foods and medicine packaged in these materials suffer water gain or loss, oxidation, discoloration, loss of taste, aroma, etc. thereby losing their customer appeal. Vinylidene copolymers have sufficient oxygen impermeability to permit their use in some food packaging applications. However, the use of these materials has been largely confined to film applications because of the processing difficulties encountered in forming thick walled objects. These vinylidene copolymers have poor heat seal characteristics, poor draw properties, low heat distortion temperatures and thermoforming stability low modulus and low strength which seriously limits their widespread use. Other polymer systems such as fully hydrolyzed polyvinyl alcohol have very high resistance to oxygen permeability but these systems have serious deficiencies in that they are water sensitive and have a very high water vapor transmission rate. Furthermore, these polyvinyl alcohol polymers fail to retain their excellent resistance to oxygen permeability at conditions of high humidity and in general have poor processing characteristics.

A definite need exists for a new class of packaging materials having a high resistance to oxygen permeability and a low water vapor transmission rate as well as improved processing and physical properties to allow the fabrication into diverse shapes and sizes, e.g., bottles, containers, sheets, thin films, etc.

SUMMARY

The required degree of oxygen impermeability and water vapor transmission (WVT) in a packaging material will vary with the particular food or medicine to be packaged and the storage conditions, e.g., temperature, humidity, ventilation, light type and intensity, etc. In general, the more critical applications will require a material with an oxygen permeability below 6.5 cc./100 sq. in. 24 hr. atmos. mil at 73° F. and a WVT of less than 8.5 gms./24 hr. 100 sq. in. mil at 100° F. in 95% R.H.

This criticality is illustrated in Modern Packaging, March 1965, "Flexible-Vacuum Performance," p. 201 et seq. wherein the extreme sensitivity of coffee to moisture and oxygen is discussed. The authors of this article state that an increase in the moisture content of coffee of about 1%, i.e., from 1.4 to 2.6%, will cause a stale odor after 20 days, while only 14 cc. of oxygen will cause staling in one pound of coffee.

Dairy foods, meat products and some medicines show as much if not greater oxygen and moisture sensitivity as coffee and in some instances require packaging materials with even greater impermeability to oxygen and water vapor than that required for coffee packaging.

This invention is directed towards furnishing a packaging material designed to meet these more critical packaging requirements.

It is, therefore, an object of this invention to provide novel packaging materials for foods, medicines, and related objects, wherein the packaging materials exhibit a high resistance to oxygen permeability and low water vapor transmission rate as well as improved processing and physical properties.

It is a further object of this invention to provide a process for the preparation of packaging materials for foods, medicines and related objects, wherein the packaging materials exhibit a high resistance to oxygen permeability and a low water vapor transmission rate as well as improved processing and physical properties.

It is a further object of this invention to provide foods, medicines and related substances which are protected by a novel packaging material which exhibits high resistance to oxygen permeability and a low water vapor transmission rate as well as improved processing and physical properties.

It is another object of this invention to provide a composition of matter which may be formed into a packaging material which will accomplish the aforesaid objects.

DESCRIPTION OF THE PREFERRED EMBODIMENTS

The above and other objects are obtained by providing packaging materials for foods, medicines and other related substances wherein the packaging materials exhibit oxygen permeability of less than 6.5 cc./100 sq. in. 24 hr. atmos. mil at 73° F. and water vapor transmission of less than 8.5 gms./24 hr. 100 sq. in. mil at 100° F. and 95% R.H. and comprise the polymerization product of acrylonitrile and at least one other comonomer wherein the acrylonitrile component constitutes from about 55 to about 90 weight percent of the packaging material.

The component responsible for the improved barrier properties described in this invention is the acrylonitrile component which must be present in an amount of at least 55 weight percent of the total polymer weight. This is necessary in order to obtain a WVT of less than 8.5 gms./24 hr. 100 sq. in. mil at 100° F. and 95% R.H. and an oxygen permeability of less than 6.5 cc./100 sq. in. 24 hr. atmos. mil at 73° F. These levels of permeance are the maximum limits tolerable for use in areas requiring critical barrier properties, if product degradation, oxidation or loss of taste and/or aroma is to be avoided. Even within this area, certain products require packaging materials with correspondingly lower oxygen permeability and WVT rates than others.

The weight percent range of acrylonitrile used in the polymers of this invention is from 55 to 90 weight percent with 60 to 85 weight percent preferred. Especially preferred are copolymers having an acrylonitrile content of 65–80 weight percent.

The lower limit of 55 weight percent acrylonitrile is essential if the packaging material is to be used in the critical packaging applications discussed above. The upper limit of 90% is critical in order to maintain the low rate of WVT and to provide a material that is readily processable into bottles, containers, sheets and films. As the acrylonitrile content of the polymer exceeds 90 weight percent and approaches 100 weight percent, it becomes extremely difficult to shape the polymer into bulky objects (e.g., bottles, containers, sheets, etc.) in conventional plastic forming equipment. Thin films of polymers containing more than 90% acrylonitrile are most conveniently prepared by solvent casting processes and are not adaptable to forming bulky objects. Upon heating to about 220° C., polymers containing more than 90% acrylonitrile retain sufficient crystallinity essentially to preclude flow. When heated to the still higher temperatures that are required to melt the crystalline acrylonitrile chains (approximately 285° C.) the polymer rapidly degrades as shown by discoloration and reduced solubility in dimethyl formamide, dimethyl acetamide, etc. Thus, the physical properties (associated with polymer containing greater than 90% acrylonitrile) seriously limit the thermoforming of bulky objects and only allow the solvent casting of thin films.

However, the presence of at least one comonomer in the acrylonitrile polymers of this invention either prevents long sequences of acrylonitrile placement which gives rise to crystallinity or minimizes crystal size and perfection. This provides a polymer with a lower melting temperature range and good flow behavior at lower temperatures.

As a result, the polymers not only exhibit good barrier properties but also have the critical properties which allow them to be readily shaped into films and bulky objects which meet the critical packaging requirements for the applications contemplated herein.

The balance of the polymer is prepared from one or more ethylenically unsaturated monomers which are copolymerizable with acrylonitrile. Examples of these copolymerizable monomers include lower alpha olefins of from 2 to 8 carbon atoms, e.g., ethylene, propylene, isobutylene, butene-1, pentene-1, and their halogen and aliphatic substituted derivatives as represented by vinyl chloride, vinylidene chloride, etc.; monovinylidene aromatic hydrocarbon monomers of the general formula:

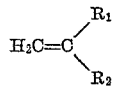

wherein $R_1$ is hydrogen, chlorine or methyl and $R_2$ is an aromatic radical of 6 to 10 carbon atoms which may also contain substituents such as halogen and alkyl groups attached to the aromatic nucleus, e.g., styrene, alpha methyl styrene, vinyl toluene, alpha chlorostyrene, ortho chlorostyrene, para chlorostyrene, meta chlorostyrene, ortho methyl styrene, para methyl styrene, ethyl styrene, isopropyl styrene, dichloro styrene, vinyl naphthalene, etc. Especially preferred comonomers are isobutylene and styrene.

Another group of comonomers suitable for use in the practice of this invention are vinyl ester monomers of the general formula:

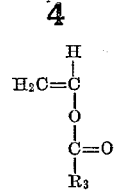

wherein $R_3$ is selected from the group comprising hydrogen, alkyl groups of from 1 to 10 carbon atoms, aryl groups of from 6 to 10 carbon atoms including the carbon atoms in ring substituted alkyl substituents; e.g. vinyl formate, vinyl acetate, vinyl propionate, vinyl benzoate and the like.

Similar to the foregoing and also useful are the vinyl ether monomers of the general formula:

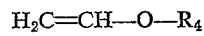

wherein $R_4$ is an alkyl group of from 1 to 8 carbon atoms, an aryl group of from 6 to 10 carbons, or a monovalent aliphatic radical of from 2 to 10 carbon atoms, which aliphatic radical may be hydrocarbon or oxygen-containing, i.e., an aliphatic radical with ether linkages, and may also contain other substituents such as halogen, carbonyl, etc. Examples of these monomeric vinyl ethers include vinyl methyl ether, vinyl ethyl ether, vinyl n-butyl ether, vinyl 2-chloroethyl ether, vinyl phenyl ether, vinyl isobutyl ether, vinyl cyclohexyl ether, p-butyl cyclohexyl ether, vinyl ether or p-chlorophenyl glycol, etc.

Especially useful as comonomers in the practice of this invention are those comonomers which contain a mono- or di-nitrile function. Examples of these include methylene glutaronitrile, (2,4-dicyanobutene-1), vinylidene cyanide, crotonitrile, fumarodinitrile, maleodinitrile.

This invention also contemplates the use of a synthetic or natural rubber component such as polybutadiene, isoprene, neoprene, nitrile rubbers, natural rubbers, acrylonitrile-butadiene copolymers, ethylene-propylene copolymers, chlorinated rubbers, etc., which are used to strengthen or toughen packaging materials prepared from this invention. This rubbery component may be incorporated into the acrylonitrile containing polymer by any of the methods which are well known to those skilled in the art, e.g., direct polymerization of monomers, polyblends, grafting the acrylonitrile monomer mixture onto the rubbery backbone, physical admixtures of the rubbery component, etc. Especially preferred are polyblends derived by mixing a graft copolymer of the acrylonitrile and comonomer on the rubbery backbone with another copolymer of acrylonitrile and the same comonomer.

The acrylonitrile copolymers of this invention may be prepared according to any method well known to those skilled in the art, e.g., by bulk, emulsion, solution, and suspension polymerization methods. They may be prepared with atmospheric, sub-atmospheric or super-atmospheric pressures.

The packaging films prepared from the foregoing polymers may be made by extrusion, pressing, calendering, casting and by other means well known to those skilled in the art. Bottles and containers may be made by any of the conventional methods such as blow extrusion, injection molding, vacuum forming, casting, etc.

This invention also contemplates the use of conventional additives such as dyes, fillers, pigments, plasticizers, stabilizers, etc. in the packaging materials of this invention.

The following examples are given in illustration of the invention and are not to be construed as limitations thereof. All parts and percentages are by weight unless otherwise indicated.

EXAMPLE I

This example is set forth as a control to indicate the test methods used and to show the poor results obtained when using an acrylonitrile (AN)) containing polymer that contains less than 55 weight percent acrylontrile.

100 grams of a styrene-acryolonitrile (SAN) copolymer having an acrylonitrile content of 26 weight percent is compression molded at 510° F. and 10,000 p.s.i. for 30 seconds to form a clear transparent film 5 mils thick. This film is cut into rectangular sections and tested for oxygen permeability in a Dow Cell according to ASTM procedure D 1434–63 and for water vapor transmission (WVT) according to ASTM procedure E 96–63T. The following results are obtained.

WVT at 100° F. and 95% R.H. 12.0 gms./24 hr. 100 sq. in. mil

Oxygen permeability at 73° F. 36.0 cc./100 sq. in. 24 hr. atmos. mil.

These values are significantly above the maximum that can be tolerated in the more critical packaging applications. The higher values, as will be demonstrated later, are attributed to the fact that insufficient acrylonitrile has been used in the preparation of the polymer.

The WVT rate is given in terms of grams of water transmitted through a film having a thickness of one mil and an area of 100 square inches in a 24-hour period wherein the ambient conditions are maintained at 100° F. and 95% relative humidity (R.H.). The oxygen permeability rate is given in terms of cubic centimeters of oxygen which permeates through a film having a thickness of one mil and an area of 100 square inches during a 24-hour period under one atmosphere (760 mm.) of oxygen at 73° F.

The following Examples II–VIII are tabulated in the following Table 1 to illustrate the superior and unexpected WVT rates and oxygen impermeability that are obtained when using the polymers of this invention, with their critical acrylonitrile content, as packaging materials. In each case, the films are prepared and tested according to the methods set forth in Example I.

TABLE 1.—WVT AND OXYGEN PERMEABILITY FOR ACRYLONITRILE COPOLYMERS

| Example | Polymer | Wt. percent of AN | WVT [1] | Oxygen permeability [2] |
|---|---|---|---|---|
| II | SAN (Styrene-Acrylonitrile). | 60 | 7.2 | 4.1 |
| III | SAN | 69 | 5.3 | 1.8 |
| IV | SAN | 70 | 5.1 | 0.88 |
| V | Acrylonitrile/isobutylene (AN/IB). | 70 | 2.67 | 0.40 |
| VI | AN/IB | 80 | 1.96 | 0.27 |
| VII | AN/α-methyl styrene | 71 | 3.31 | 0.43 |
| VIII | AN/vinylidene chloride | 55 | 2.8 | 2.5 |

[1] WVT values given in gms./24 hr. 100 sq. in. mil at 100° F. and 95% R.H.
[2] Oxygen permeability values given in cc./100 sq. in. 24 hr. atmos. mil, 73° F.

The data in the foregoing table illustrates the superior WVT rate and oxygen permeability rate that are obtained when using copolymers in the practice of this invention which have an acrylonitrile content of from 55 to 90 percent by weight. The results illustrate that the copolymers of isobutylene (Examples V–VI) give the lowest WVT while copolymers of styrene (Examples II–IV) give the highest WVT. However, the copolymers of styrene still give WVT's which are well within the aforementioned critical range. The lowest oxygen permeability values are obtained using isobutylene as a comonomer (Examples V–VI). Alpha-methyl styrene (Example VII) shows the next best oxygen permeability results. The copolymers of styrene (Examples II–IV) and vinylidene chloride (Example VIII) while showing oxygen permeability rates higher than the foregoing copolymers, are still well below the maximum of the oxygen permeability range that can be tolerated in the more critical packaging applications.

The results in Table 2 illustrate the inferior water and/or oxygen permeability of some well known packaging materials which do not contain acrylonitrile. These results further emphasize the totally unexpected, superior properties that are achieved when using the polymers of this invention, which contain from 55 to 90 weight percent of acrylonitrile.

TABLE 2.—WVT AND OXYGEN PERMEABILITY FOR COPOLYMERS WHICH CONTAIN NO ACRYLONITRILE

| Example | Polymer | WVT [1] | Oxygen permeability [2] |
|---|---|---|---|
| IX | Polystyrene (oriented) | 9.4 | 326.0 |
| X | Polystyrene (unoriented) | | 416.0 |
| XI | High density polyethylene | 0.85 | 512.0 |
| XII | Low density polyethylene | 1.3 | 510.0 |
| XIII | 4-methyl pentene/3-methyl butene.[3] | 6.8 | 2790.0 |
| XIV | Polyvinyl chloride | 2.7 | 10.0 |
| XV | Polypropylene (biaxially oriented). | | 140.0 |
| XVI | Polycarbonate | | 135.0 |

[1] WVT values given in gms./24 hr. 100 sq. in. mil at 100° F. and 95% R.H.
[2] Oxygen permeability values given in cc./100 sq. in. 24 hr. atmos. mil at 73° F.
[3] Prepared using an 85/15 mol percent monomer feed ratio.

The unexpected decrease in WVT obtained when using polymers containing from 55 to 90 weight percent of acrylonitrile is demonstrated by the following Table 3 where the WVT for styrene/acrylonitrile polymers is set forth as a function of the weight percent of acrylonitrile.

TABLE 3.—WVT OF SAN COPOLYMERS

| Wt. percent of styrene | Wt. percent of AN | WVT [1] |
|---|---|---|
| 100 | | 19 |
| 90 | 10 | 27 |
| 80 | 20 | 32 |
| 60 | 40 | 37 |
| 51 | 49 | 22 |
| 40 | 60 | 16 |
| 30 | 70 | 11 |

[1] Measured at 120° F. and 95% R.H., values in gms./24 hr. 100 sq. in. mil.

A plot of WVT versus weight percent acrylonitrile indicates that the WVT increases to a maximum at 35–40 weight percent acrylonitrile. After reaching this maximum, the WVT unexpectedly falls off as the weight percent of acrylonitrile approaches 90. A homopolymer of polyacrylonitrile is not of interest despite similar barrier properties because such a homopolymer cannot be fabricated from the melt; the flow temperature is higher than the decomposition temperature. The only known way to fabricate a polyacrylonitrile is by film casting or extrusion from solution. This, however, not only necessitates the use of suitable solvent systems, which, at best, are expensive and unwieldy and which may also create toxicity problems, but also it is not possible to form anything other than film sheets from solvent casting, thereby precluding production of shaped articles such as bottles which are an important and integral part of this invention.

EXAMPLE XVII

This example illustrates the preparation of bottles to be used in the packaging of food, medicines and related substances.

Four ounce (4 oz.) Boston Round bottles are prepared using the same polymers as those used to prepare the films in Examples II–VIII. The bottles were prepared using a blow extruder and a stock temperature of 450–500° F. to give bottles with an average wall thickness of 20 mils. Gas chromatograph tests indicate that these bottles have oxygen barrier properties equal to their film counterparts tested set forth in Examples II–VIII.

EXAMPLE XVIII

This example illustrates the use of methylene glutaronitrile (MGN) as a comonomer in the preparation of packaging materials. A copolymer of methylene glutaronitrile and acrylonitrile having an acrylonitrile content of 70 weight percent is formed into a film according to the method set forth in Example I, to give an easily processable packaging material with WVT and oxygen permeability properties comparable to the acrylonitrile/isobutylene film of Example V.

EXAMPLE XIX 50 parts of a monomer charge comprising 80% by weight acrylonitrile and 20% by weight isobutylene is polymerized in the presence of 100 parts of a butadiene/acrylonitrile rubber having a butadiene content of 93% by weight using a conventional emulsion graft polymerization technique. As the reaction proceeds, the emulsion becomes unstable. At the end of the reaction, the precipitated graft copolymer is removed from the vessel and dried. Ten parts of the resulting graft copolymer is mechanically blended with 90 parts of the acrylonitrile/isobutylene copolymer of Example VI, wherein the acrylonitrile content is 80% by weight, forming a homogeneous polymeric product having good barrier properties and improved impact strength.

It should be noted that any acrylonitrile appearing in the rubber upon which grafting takes place, as, for example, the butadiene-acrylonitrile rubber of Example XIX, is not included as being part of the 55–90 weight percent acrylonitrile upon which the compositions of this invention are based. In other words, there will be 55–90 weight percent acrylonitrile based on the weight of the total polymeric system in addition to any acrylonitrile which might appear in the rubber.

It is obvious that many deviations may be made in the products and processes set forth above without departing from the scope of this invention.

What is claimed is:

1. A package comprising foodstuffs or medicines completely enveloped in a molded container formed from a resin which exhibits oxygen permeability of less than 6.5 cc./100 sq. in. 24 hr. atmos. mil at 73° Fahrenheit and water vapor transmission of less than 8.5 gms./24 hr. 100 sq. in. mil at 100° Fahrenheit and 95 percent R.H., said resin comprising (A) 75 to 100 parts by weight of the interpolymer formed as the polymerization product of an acrylonitrile and at least one other comonomer selected from the group consisting of vinylidene aromatic compounds, lower alpha mono-olefins of 2 to 8 carbon atoms and methylene glutaronitrile; and (B) 0 to about 25 parts by weight of the product of the graft polymerization onto a preformed rubber substrate of a monomer mixture of 55 to 90 weight percent acrylonitrile and, corespondingly, 45 to 10 percent of the comonomer selected in the interpolymer of (A) above; the total acrylonitrile in the resin comprising 55 to 90 weight percent thereof, said container having been formed by moulding the molten interpolymer in an essentially solvent-free condition or by forming a sheet produced from the molten interpolymer in an essentially solvent-free condition.

2. The package in accordance with claim 1 wherein said resin contains 5 to 25 percent by weight of the graft polymerization product.

3. The package in accordance with claim 2 wherein the preformed rubber substrate is a copolymer of butadiene and acrylonitrile.

4. The package in accordance with claim 1 wherein said comonomer is an isobutylene.

5. The package in accordance with claim 1 wherein particles of said resin are molded into said container.

6. The package in accordance with claim 1 wherein particles of said resin are extruded into sheet material which is thermoformed into said container.

7. The package in accordance with claim 5 wherein said resin contains 5 to 25 parts of the graft polymerization product and wherein said comonomer is isobutylene.

References Cited

UNITED STATES PATENTS

| | | | |
|---|---|---|---|
| 2,531,196 | 10/1942 | Brubaker et al. | 260—85.5 |
| 2,802,809 | 8/1957 | Hayes | 260—876 |
| 2,843,572 | 7/1958 | Wooten et al. | 260—85.5 |
| 3,252,933 | 5/1966 | Kim et al. | 260—29.7 |
| 3,157,519 | 11/1964 | Butt | 53—37 XR |

FOREIGN PATENTS

| | | |
|---|---|---|
| 851,491 | 10/1960 | Great Britain. |

OTHER REFERENCES

Modern Plastics Encyclopedia, vol. 41, No. 1A, September 1963 (1964 issue), pp. 144–148, 181–187, 467 and 647.

SAMUEL H. BLECH, *Primary Examiner.*

M. J. TULLY, *Assistant Examiner.*

U.S. Cl. X.R.

99—171; 215—1; 260—4, 78.5, 85.5, 876, 878, 879, 880